US012767137B2

(12) United States Patent
Vijaya Kumar et al.

(10) Patent No.: US 12,767,137 B2
(45) Date of Patent: Oct. 20, 2026

(54) METHOD AND SYSTEM TO DYNAMICALLY DETERMINE A LANE OF TRAVEL AND ADJACENT LANES FOR A VEHICLE APPROACHING A ROAD INTERSECTION

(71) Applicant: GM GLOBAL TECHNOLOGY OPERATIONS LLC, Detroit, MI (US)

(72) Inventors: Vivek Vijaya Kumar, Shelby Township, MI (US); Hariharan Krishnan, Troy, MI (US); Muhammad Rehan, Troy, MI (US); Shah Hussain, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/048,311

(22) Filed: Feb. 7, 2025

(65) Prior Publication Data

US 2026/0233742 A1 Aug. 13, 2026

(51) Int. Cl.

| | |
|---|---|
| ***B60W 30/00*** | (2006.01) |
| ***B60W 30/18*** | (2012.01) |
| ***G01C 21/36*** | (2006.01) |
| ***G08G 1/0967*** | (2006.01) |

(52) U.S. Cl.
CPC ... *B60W 30/18154* (2013.01); *G01C 21/3658* (2013.01); *G08G 1/096708* (2013.01)

(58) Field of Classification Search
None
See application file for complete search history.

(56) References Cited

U.S. PATENT DOCUMENTS

| | | | | |
|---|---|---|---|---|
| 10,816,993 | B1 * | 10/2020 | Tran | G05D 1/0088 |
| 12,424,099 | B1 * | 9/2025 | Porter | G08G 1/167 |
| 12,485,924 | B1 * | 12/2025 | Ali | B60W 30/143 |
| 12,559,121 | B2 * | 2/2026 | Yasui | B60K 35/28 |
| 2015/0316386 | A1 * | 11/2015 | Delp | B60W 30/18154 701/532 |
| 2016/0176398 | A1 * | 6/2016 | Prokhorov | B62D 15/0265 701/23 |
| 2019/0250639 | A1 * | 8/2019 | Xu | B60W 30/165 |
| 2021/0387643 | A1 * | 12/2021 | Hari | B60W 30/095 |
| 2021/0389769 | A1 * | 12/2021 | Hari | B60W 30/09 |

(Continued)

FOREIGN PATENT DOCUMENTS

| | | | |
|---|---|---|---|
| DE | 112021000094 | T5 | 6/2022 |
| WO | 2024106953 | A1 | 5/2024 |

*Primary Examiner* — Jonathan M Dager
(74) *Attorney, Agent, or Firm* — Ingrassia Fisher & Lorenz, LLP | IFL

(57) ABSTRACT

A method for identifying a route of travel for a vehicle operating an in-vehicle application as the vehicle is approaching a traffic light at a traffic intersection is provided. A traffic signal information is received from a traffic control device located about a traffic intersection having two or more roads together. Global positioning data having a vehicle location data for the vehicle is received, a travel lane of the identified lanes for the vehicle is determined based on the traffic signal information and the global positioning data. The travel lane is output as travel lane data for evaluation by the in-vehicle application to configure a future vehicle operation for the vehicle. The traffic signal information includes map data, and signal, phase and timing data for a traffic light associated with the traffic control device.

20 Claims, 9 Drawing Sheets

(56) References Cited

U.S. PATENT DOCUMENTS

| | | | | |
|---|---|---|---|---|
| 2022/0097708 | A1* | 3/2022 | Jin | G06V 10/766 |
| 2022/0138568 | A1* | 5/2022 | Smolyanskiy | G06N 3/0442 706/21 |
| 2022/0340137 | A1* | 10/2022 | Ollis | B60W 30/09 |
| 2022/0340138 | A1* | 10/2022 | Seegmiller | B60W 30/045 |
| 2023/0150508 | A1* | 5/2023 | Nimura | B60W 30/18163 701/41 |
| 2023/0213945 | A1* | 7/2023 | Sajjan | B60W 30/095 701/28 |
| 2023/0222905 | A1* | 7/2023 | Xu | G08G 1/0112 340/913 |
| 2025/0068160 | A1* | 2/2025 | Mariani | G05D 1/0038 |
| 2025/0251244 | A1* | 8/2025 | Niewiadomski | G06V 20/588 |
| 2025/0292459 | A1* | 9/2025 | Deshmukh | G06T 11/23 |
| 2026/0048764 | A1* | 2/2026 | Min | B60W 30/09 |

* cited by examiner

METHOD AND SYSTEM TO DYNAMICALLY DETERMINE A LANE OF TRAVEL AND ADJACENT LANES FOR A VEHICLE APPROACHING A ROAD INTERSECTION

INTRODUCTION

The technical field generally relates to dynamically determining a lane of travel for a vehicle, and more specifically identifying a lane of travel and lanes adjacent to the lane of travel for the vehicle.

Vehicle operations can benefit from when infrastructure related information, such as phase and timing of traffic lights, geometry of roadway and intersections, etc. to increase driver awareness while approaching a signalized intersection. In general, traffic control devices provide only the current state of the device, which presents a challenge for determining the optimal speed to approach an intersection. Additionally, the Green Light Optimal Speed Advisory (GLOSA) application requires lane-level map matching to compute an optimal speed and increase driver awareness when approaching an intersection.

Other in-vehicle applications may also benefit from having accurate lane-level localization of vehicles to increase application performance. Likewise, some vehicle applications would also benefit from information regarding the lanes adjacent to the vehicle's current lane of travel.

The present disclosure addresses the above-mentioned issues and more.

SUMMARY

In one aspect, the present disclosure provides a method for identifying a route of travel for a vehicle operating an in-vehicle application as the vehicle is approaching a traffic light at a traffic intersection. The method includes receiving, by a controller of the vehicle, traffic signal information from a traffic control device located about the traffic intersection that junctions two or more roads together. The traffic signal information includes map data related to geographical information pertaining to features of the traffic intersection and identified lanes for each road at the traffic intersection. The traffic signal information also includes signal, phase and timing data for the traffic light. The method further includes receiving, by the controller of the vehicle, a global positioning data having a vehicle location data for the vehicle and determining a travel lane of the identified lanes for the vehicle based on the traffic signal information and the global positioning data to output as travel lane data for evaluation by the in-vehicle application to configure a future vehicle operation for the vehicle.

In some forms, the vehicle operation includes determining one or more future travel routes, an engine operation, or a combination thereof for the vehicle.

In at least one form, the method includes transmitting the travel lane data to the in-vehicle application of the vehicle to configure the future travel routes, the engine operation, or the combination thereof.

In yet another form, the method includes determining whether one or more adjacent lanes to the travel lane exists based on the traffic signal information; determining whether the adjacent lane is a right lane or a left lane relative to the travel when the adjacent lane exists; and outputting a control operation to control the future vehicle operation in response to determining the travel lane of the vehicle and determining whether the adjacent lane is a right line or a left lane.

In still another form, the control operation is selected from the group consisting of: i) selecting an alternative travel lane for the vehicle; ii) initiating an engine start/stop feature for the vehicle when about or near the traffic intersection; iii) displaying an indicator that indicates whether the adjacent lane to the travel lane is a right lane or a left lane; or iv) a combination thereof.

In one form, the step of determining a travel lane of the identified lanes for the vehicle further includes: iterating a list of all ingress lanes based on the map data of the traffic signal information; iterating on one or more waypoints for each lane of the list of all ingress lanes; converting a location of each waypoint to x,y coordinates with respect to the location of the vehicle; determining a distance between each waypoint of the one or more waypoints and a location the vehicle; and identifying the travel lane based on a selected waypoint that is closest in distance to the vehicle based on the distance between each waypoint and the vehicle.

In some forms, the step of identifying the travel lane based on the waypoint that is closest to the vehicle further includes: a) selecting a first point of the travel lane near or about the intersection; b) iterating step a) for any remaining lanes of the identified lanes based on the map data; c) compute a difference in coordinates between the first point of the travel lane and a first point of each of the remaining lanes; d) determine whether each lane of the remaining lanes is an adjacent lane of the travel lane based on a longitudinal distance between each of the first point of the travel lane and the first point of each of the remaining lanes; and e) identify whether each lane determined as an adjacent lane to the travel lane is a right lane or a left lane.

In some forms, the program instruction of identifying whether each lane determined as an adjacent lane is further configured to select a first point and a second point of the travel lane closest to the traffic intersection; compute a first position vector between the first point and the second point of the travel lane closest to the intersection; compute a second position vector between the second point of the travel lane closest to the intersection and the first point of each adjacent lane to the travel lane; compute a sign of cross product of the first position vector and the second position vector; and identify each adjacent lane as a right lane or a left lane of the travel lane of the vehicle based on the sign of the cross product.

In yet another form, the program instructions are further configured to detect whether another vehicle is located ahead of the vehicle in the same lane as the travel lane, each adjacent lane to the travel lane, or a combination thereof; determine whether to traverse from the travel lane to an adjacent lane based on at least one of determining whether another vehicle is located ahead of the vehicle, a vehicle speed for a respective vehicle located ahead of the vehicle, a recommended vehicle speed or a combination thereof. The traffic signal information further includes the recommended vehicle speed being a vehicle speed for the vehicle to approach the traffic intersection to catch a green light associated with the traffic light located at the traffic intersection. The program instructions are further configured to compile another a route having the adjacent lane as a future travel lane for the vehicle based on determining whether to traverse from the travel lane to the adjacent lane.

In yet another aspect, the present disclosure includes a vehicle. The vehicle includes a processor; and a non-transitory storage medium having program instructions executed by the processor. The program instructions are configured to: receive a traffic signal information from a traffic control device located about a traffic intersection having two or more roads joining together as the vehicle is approaching a traffic light at a traffic intersection. The traffic light is located at the traffic intersection. The traffic signal information includes map data related to geographical information pertaining to features of the traffic intersection and identified lanes for each road junction at the traffic intersection. The traffic signal information includes signal, phase and timing data for the traffic light. The program instructions are further configured to receive a global positioning data having a vehicle location data for the vehicle; determine a travel lane of the identified lanes for the vehicle based on the traffic signal information and the global positioning data to output as travel lane data for evaluation by the an in-vehicle application of the vehicle to configure a future vehicle operation for the vehicle; determine whether one or more adjacent lanes to the travel lane exists based on the traffic signal information; determine whether the adjacent lane is a right lane or a left lane to the travel when the adjacent lane exists; and output a control operation to control the future vehicle operation in response to determining the travel lane of the vehicle and determining whether the adjacent lane of travel of the vehicle is a right line or a left lane.

BRIEF DESCRIPTION OF DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the methods and systems described herein. Furthermore, there is no intention to be bound by any expressed or implied theory presented in the preceding introduction or summary, or the following detailed description. As used herein, the terms "controller" and/or "module" refers to an application specific integrated circuit (ASIC), an electronic circuit, a processor (shared, dedicated, or group) executing software or firmware programs stored in memory, a combinational logic circuit, and/or other suitable components that provide the described functionality.

The present disclosure relates to a method for identifying a route of travel for a vehicle operating vehicle driving related operations. The method disclosed herein includes several benefits, advantages, and improvements over current in-vehicle traffic related applications. In one example, the method and system of the present disclosure improves driver awareness while approaching a signaled intersection. In another aspect, the method informs a driver about one or more possible actions specific to location and speed of the vehicle based on the signal phase and timing of the traffic light. In another aspect, the method enhances the performance of various other in-vehicle applications by using the travel lane and identified adjacent lanes of the vehicle.

Figure 1:
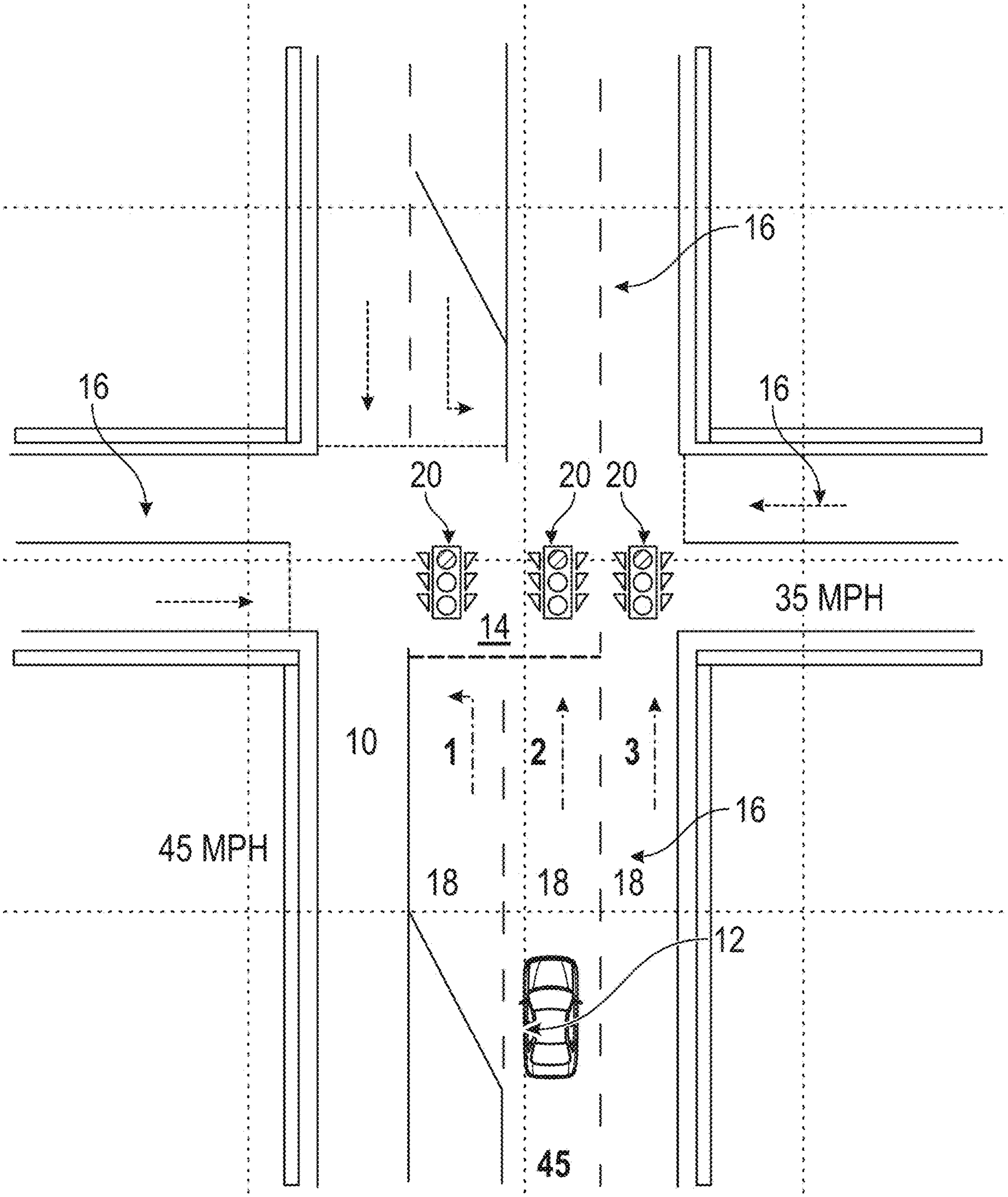
FIG. 1 is a diagrammatic view of exemplary driving environment for executing a method, according to the disclosure provided herein, to identify a travel lane and lanes adjacent to the travel lane for executing vehicle driving related operations when a vehicle is approaching a traffic light located at a traffic intersection.
Figure 2:
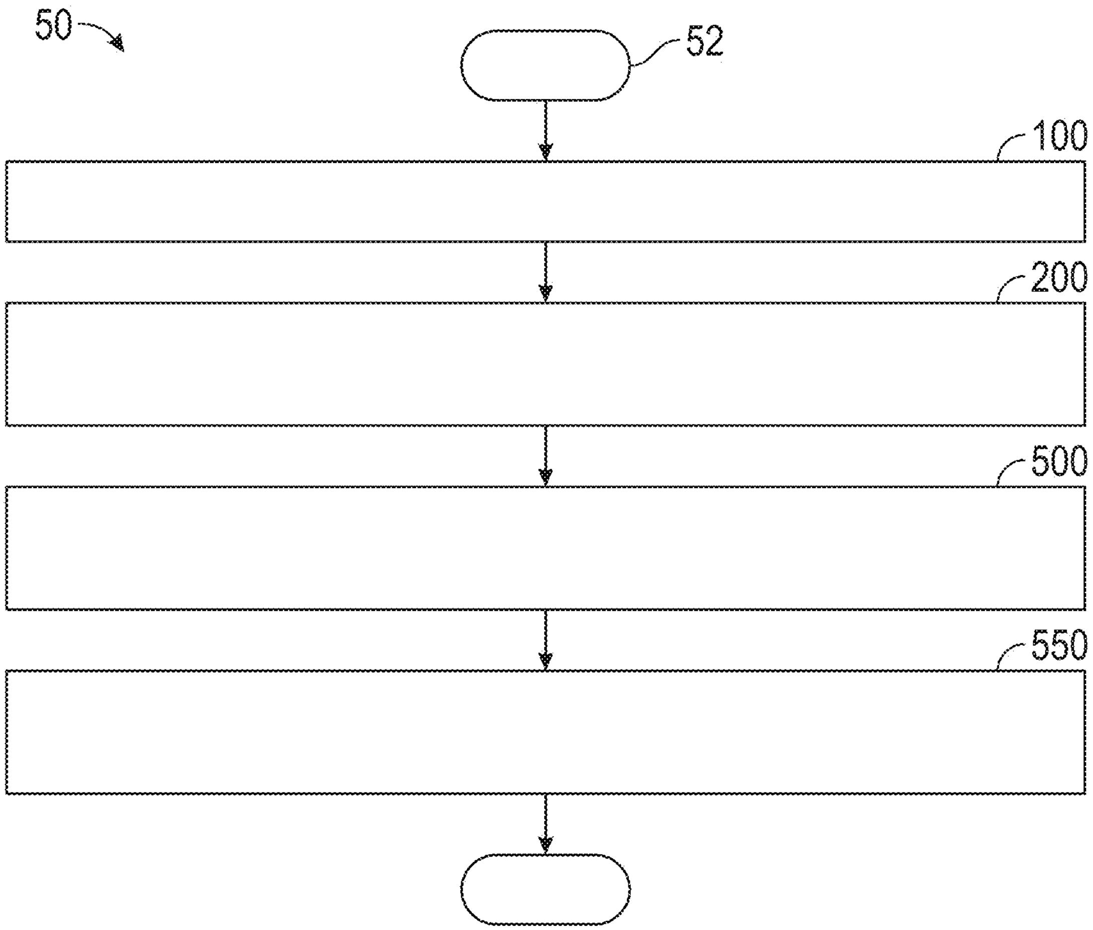
FIG. 2 is a flow chart of an overview of the method of FIG. 1.

FIG. 1 illustrates an exemplary environment having a vehicle 12 performing various vehicle driving related operations that are incorporated into the vehicle 12 using a travel lane of the vehicle. In particular, a method 50, shown in FIG. 2, is employed, by the vehicle 12, as the vehicle 12 approaches a traffic intersection 14 having two or more roads 16 joining together. Each road 16 of the traffic intersection 14 includes multiple lanes 18 as shown. Located at the traffic intersection 14 is traffic control devices 20, such as smart traffic lights. In a broad sense, a traffic control device 20 is a component in an intelligent traffic infrastructure system that is capable of acquiring traffic and infrastructure data from a region around the traffic control device 20, as well as processing and wirelessly communicating data messages (such as a traffic signal information, traffic safety messages and the like) with other devices including vehicle devices in the vicinity of the traffic control device 20. The intelligent traffic infrastructure system may integrate sensors, routers, switches, servers and other network components to form a communication network for monitoring and communicating messages concerning vehicle or pedestrian traffic, road conditions, traffic control signal phase, etc.

In one example, the traffic control device 20 may be a traffic light having a traffic signal controller configured to wirelessly communicate with the vehicle 12. In one form, the traffic signal controller broadcasts messages within a predetermined range surrounding the vehicle 12. The traffic signal controller may transmit or broadcast messages (e.g., data packets containing messages or data) using a dedicated communication protocol, such as a dedicated short-range communication (DSRC), a vehicle-to-vehicle (V2V) communication system, a Cellular Vehicle-to-Everything (C-V2X), Vehicle-to-Infrastructure (V2I), Vehicle-to-People (V2P), 5GLTE cellular communication, or the like. Using this communication broadcast protocol, the traffic signal controller is able to transmit at low latency to ensure that messages can be quickly transmitted and received. In some forms, the traffic signal controller also manages incoming and outgoing data transmissions for its respective communication network and may employ asymmetric encryption to secure broadcast messages transmitted or exchanged with the GPS system, other the traffic control devices, other traffic system infrastructure devices and vehicles.

In one form, the traffic signal controller detects an approaching vehicle 12 and, in response, broadcasts various traffic signal information to the approaching vehicle 12. In other forms, the traffic signal controller broadcasts various traffic signal information continuously at predetermined time interval. In still other forms, the traffic signal controller broadcast various traffic signal information based on a request from the vehicle 12. In some embodiments, a traffic signal information includes timing data indicating when a traffic light will change from one phase to another related to each respective traffic light. In one example, the timing data includes signal, phase, and timing data (e.g., SPaT data). In one form, the SPaT data includes phase information about the signalized intersection 14, signal location and timing information for each traffic light 20 located at the intersection 14 along with related lane maneuvers. The SPaT data allows in-vehicle applications of the vehicle 12 to know a current and future phase of a traffic light 20 as the vehicle 12 approaches the intersection 14. For example, the SPaT data includes data related to signal group state, signal group timing, future intervals, connection maneuver assistance and allowed lane maneuvers. The signal group state includes data related to each traffic light 20 and provides a current phase (e.g., a current interval for the phase), an amount of time remaining in the phase, a future phase for each traffic light 20. The phase, for example, includes as a stop and remain phase (e.g., a red light), a protected movement allowed phase (e.g., a green light), and a slow down to stop phase (e.g., a yellow light). The signal group timing includes a point in time (e.g., a time mark) to indicate when an interval will change. The related lane maneuvers include data related to connection maneuver assistance and/or allowed lane maneuvers. The connection maneuver assistance data includes, but is not limited to, data related to a request for a walk indication associated with one or more pedestrian pushbutton and detecting a pedestrian in a crosswalk (not shown) of the intersection 14. The lane maneuvers data may include information related to one or more traffic requirements that the vehicle 12 considers when determining an action to change from its current travel lane to another travel lane. For example, lane maneuvers may include data for a speed limit, open/closed lanes, no right/left turn, turning lane closed, one way lane only, active school zone, a cooperative maneuver for merging lanes, pass through only lanes, organizing the vehicle 12 into a virtual platoon to cross the intersection 14, etc.

The traffic signal information may also include intersection MAP data that is geographical data pertaining to features of the traffic intersection along with identified lanes for each road junction at the traffic intersection. The MAP data allows in-vehicle applications of the vehicle 12 to understand the travel lane and lane maneuvers in order to determine which traffic light 20 controls the travel lane for the vehicle 12. In one example, the MAP data includes data indicating the number of traffic lanes for each road 16, available travel directions for each lane 18, the current phase of an associated traffic light for each lane, and a remaining time until the next traffic signal phase. For example, each lane 18 of one of the roads 16 includes a plurality of waypoints. Each waypoint is a saved location and represents latitudinal and longitudinal coordinates on a geographical map that is used for navigation, route planning, and location marking.

The vehicle 12 is in communication with the traffic signal controller and receives a traffic signal information from the traffic signal controller as the vehicle 12 approaches the traffic intersection 14. While in this example, the traffic control device 20 is a traffic light, the traffic control device 20 (e.g., a roadside traffic infrastructure device) may include any traffic control device associated with a traffic light and capable of transmitting a traffic signal information as provided herein such as a stand-alone traffic signal controller located about or near the traffic intersection 14. The vehicle 12 is also in communication with a satellite device (not shown) or a second vehicle (not shown) to receive global positioning data, from a global positioning system (hereafter referred to as a GPS system), having vehicle location data relative to the vehicle 12. The vehicle 12 will be further discussed below.

FIG. 2 provides an overview of the method 50 for identifying a travel lane and any adjacent lanes to the travel lane for operating vehicle driving related operations when the vehicle 12 is approaching a traffic light located at a traffic intersection. The vehicle 12 initiates the method 50 at start 52 and executes routine 100 for identifying a travel lane for the vehicle 12. After identifying a travel lane for vehicle 12, the method 50 executes routine 200 for determining whether one or more adjacent lanes to the travel lane of the vehicle 12 exists and proceeds from routine 200 to execute routine 500. At routine 500, the vehicle 12 determines whether an existing adjacent lane to the travel lane for the vehicle is a right lane or a left and proceeds to routine 550. The method 50 outputs a control operation to control one or more vehicle operation of the vehicle 12 from routine 550 and returns to the start 52 of method 50. In one example, the control operation of routine 550 executes at least one of routine 600 (e.g., FIG. 8), routine 700 (e.g., FIG. 9) or a combination thereof.

Figure 3:
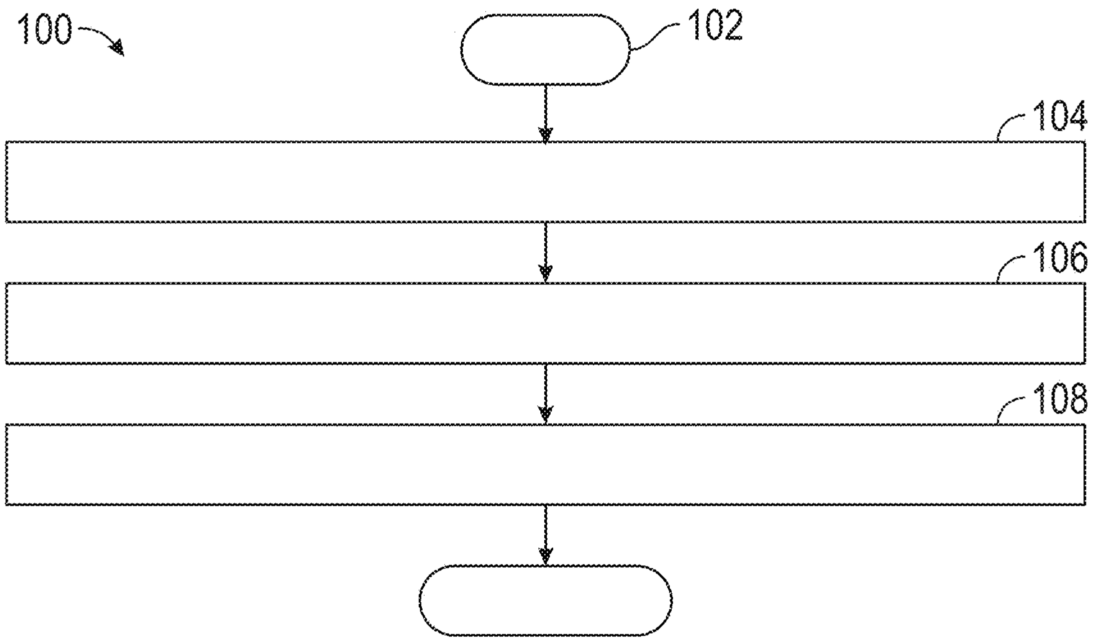
FIG. 3 is a flow chart of a routine for identifying a travel lane for the vehicle operating vehicle driving related operations of the method provided in FIG. 2.

Referring to FIG. 3, the routine 100 for identifying a travel lane for the vehicle operating vehicle driving related operations the method 50 is provided in further details. The routine 100 starts at step 102 and proceeds to step 104. At step 104, the vehicle 12 receives the traffic signal information from a traffic control device located about a traffic intersection having two or more roads joining together. Upon receiving the traffic signal information, the routine 100 proceeds from step 104 to step 106. At step 106, the vehicle 12 receives global positioning data associated with the vehicle 12. The global positing data includes vehicle location data for the vehicle 12. The routine 100 then proceeds from step 106 to 108. Using the traffic signal information and the global positioning data, the vehicle 12 determines a travel lane of the identified lanes for the vehicle 12 based on the traffic signal information and the global positioning data to output as travel lane data for evaluation by an in-vehicle application of the vehicle 12 to configure a future vehicle operation for the vehicle 12. In one form, the future vehicle operation includes determining one or more future travel routes, such as selecting an alternative travel lane for the vehicle 12. In another form, the future vehicle operation includes an engine operation, such as initiating an engine start/stop feature for the vehicle 12 when about or near the traffic intersection. In some embodiments, the vehicle 12 transmits the travel lane data to the in-vehicle application of the vehicle 12 to configure the future travel routes, the engine operation, or the combination thereof. After determining the travel lane for the vehicle 12, the method 50 proceeds from 108 to routine 200.

Figure 4:
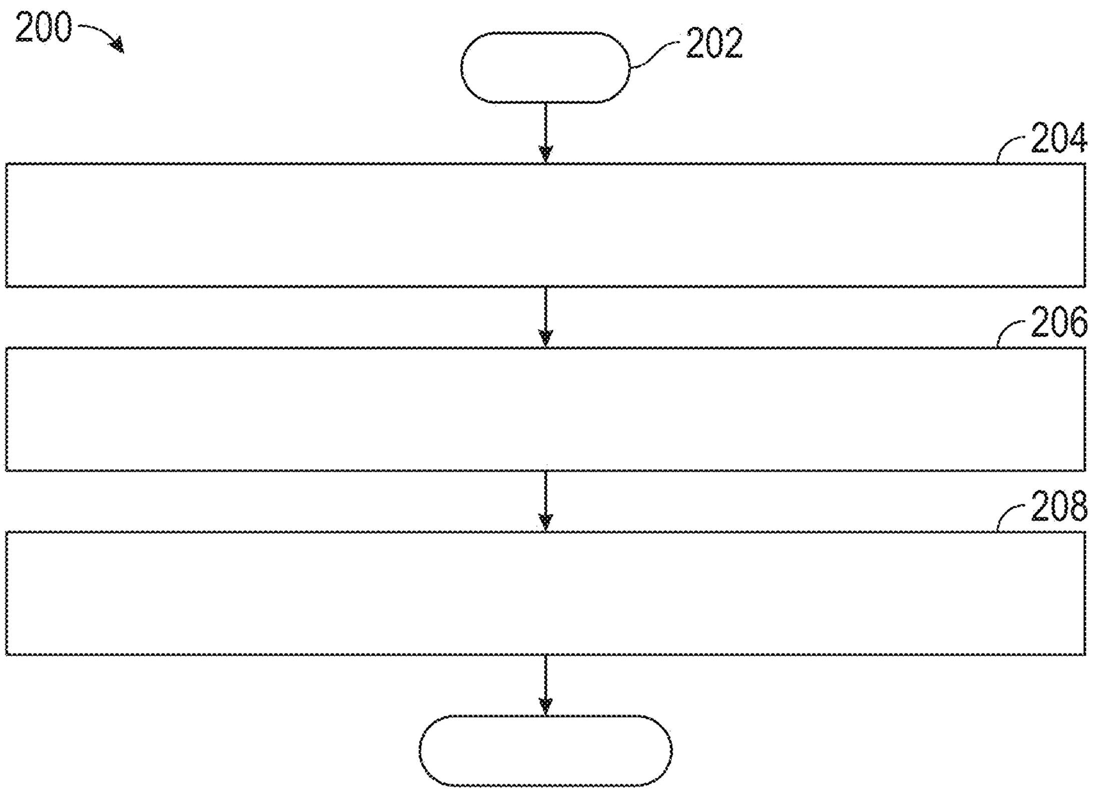
FIG. 4 is a flow chart of a routine for determining one or more adjacent lanes to the travel lane for the vehicle of the method provided in FIG. 2.

Now turning to FIG. 4, the routine 200 determines one or more adjacent lanes along a travel lane for the vehicle 12 of the method 50. The vehicle 12 employs the routine 200 and starts at step 202. At step 202, the routine 200 determines a travel lane of the vehicle 12 when approaching the traffic intersection. In one form, the routine 200 uses the information from step 108 of the routine 100 to determine the travel lane of the vehicle 12 as the vehicle 12 is approaching the traffic light at the traffic intersection. After determining the travel lane at step 202, the routine 200 proceeds to step 204. At step 204, the vehicle 12 determines whether one or more adjacent lanes to the travel lane exists based on the traffic signal information. If one or more adjacent lanes exist, the routine 200 proceeds from step 204 to step 206. At step 206, the vehicle 12 determines whether each adjacent lane is a right lane or a left lane to the travel when the adjacent lane exists and proceeds to step 208. After determining whether each adjacent lane is the right lane or the left lane, the routine 200 outputs a control operation to control the future vehicle operation of the vehicle 12 in response to determining the travel lane of the vehicle 12 and determining whether the adjacent lane of travel of the vehicle 12 is a right line or a left lane at step 208. In one form, the future vehicle operation includes displaying a graphical interface, on a display of vehicle 12, which indicates whether the adjacent lane to the travel lane is a right lane or a left lane. After outputting the control operation, the routine 200 proceeds from 208 to Routine 600.

Figure 5:
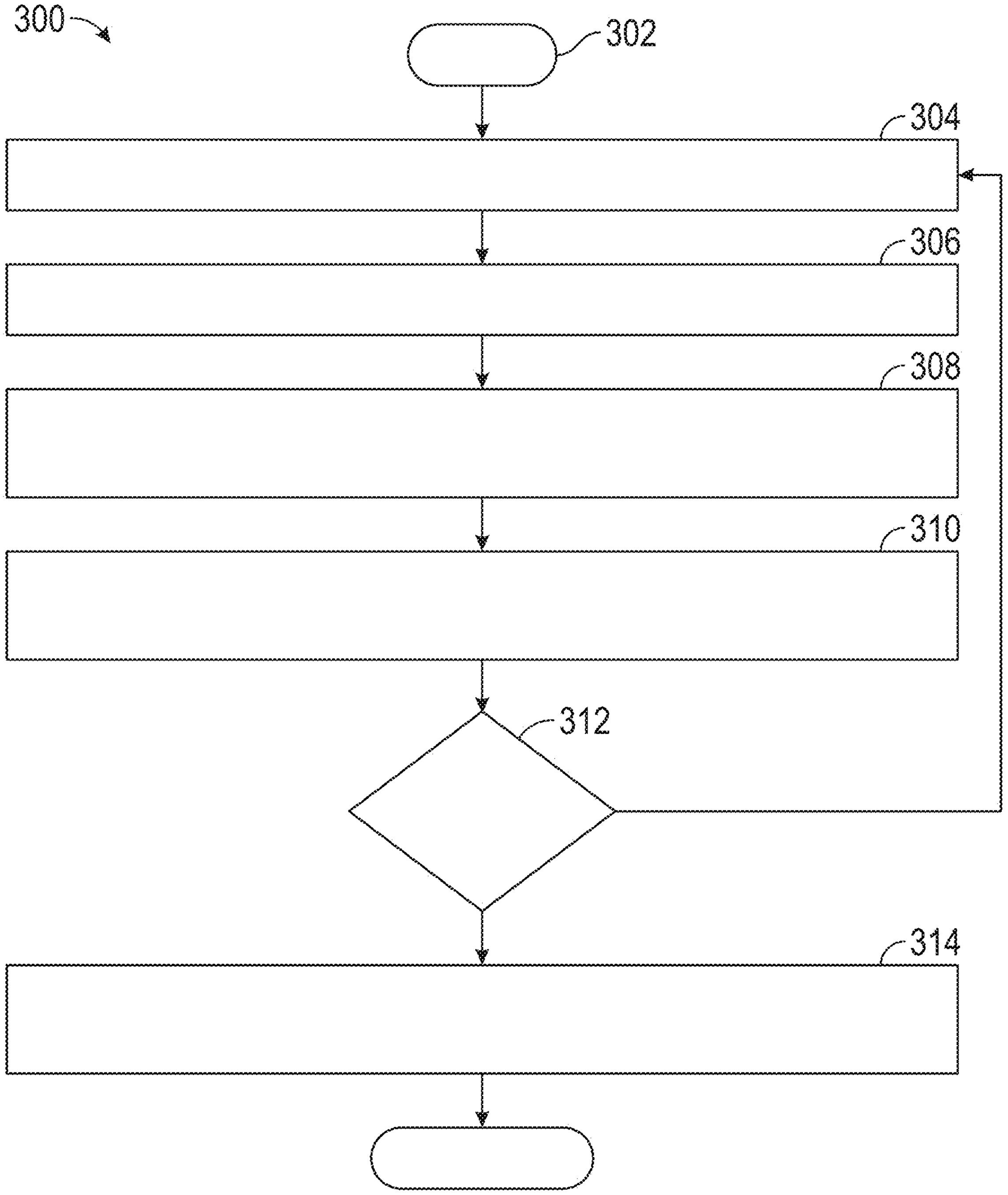
FIG. 5 is a flow chart of the routine for determining the travel lane for the vehicle provided FIG. 3 in further detail.

Turning to FIG. 5, the routine 300 for determining the travel lane for the vehicle 12 of the method 50 is provided in further details. The vehicle 12 starts the routine 300 at step 302 and proceeds to step 304. At step 304, the routine 300 iterates a list of all ingress lanes found in the map data of the traffic signal information and proceeds to step 306. In doing so, the vehicle 12 performs a lane-level map matching to find the travel lane of the vehicle 12. Using the list of all ingress lanes, the routine 300 proceeds from step 306 to step 308. At step 308, the vehicle 12 iterates on one or more waypoints for each lane determined. In one example, the vehicle 12 iterates on all waypoints of each lane at step 306 and proceeds to step 308. At step 308, the vehicle 12 converts a location of each waypoint to a two-dimensional local coordinate with respect to the location of the vehicle 12 using the global positioning data. More specifically, the vehicle 12 determines global positioning coordinates indicating the location of the waypoint based on the global positioning data. For example, the global positioning coordinates include latitudinal and longitudinal coordinates. The two-dimensional local coordinates can include x, y coordinates. The vehicle converts the latitudinal and longitudinal coordinates to x, y coordinates (such as an x, y offset) with respect to a location of the vehicle 12. Once the location of the vehicle 12 is in x, y coordinates (e.g., the x, y offset), the routine 300 proceeds from step 308 to step 310. At step 310, the vehicle 12 determines a distance for each waypoint and the vehicle 12 and proceeds to step 312. The vehicle 12 executes step 312 and determines whether the closest waypoint is further than a predetermined lane width or threshold. If the closest waypoint is greater in distance than the predetermined lane width, the routine 300 returns to step 304. Otherwise, the routine 300 proceeds from step 312 to step 314. At step 314, the vehicle 12 sets the lane associated with the respective waypoint as the travel lane for the vehicle 12 and proceeds to Routine 400.

Figure 6:
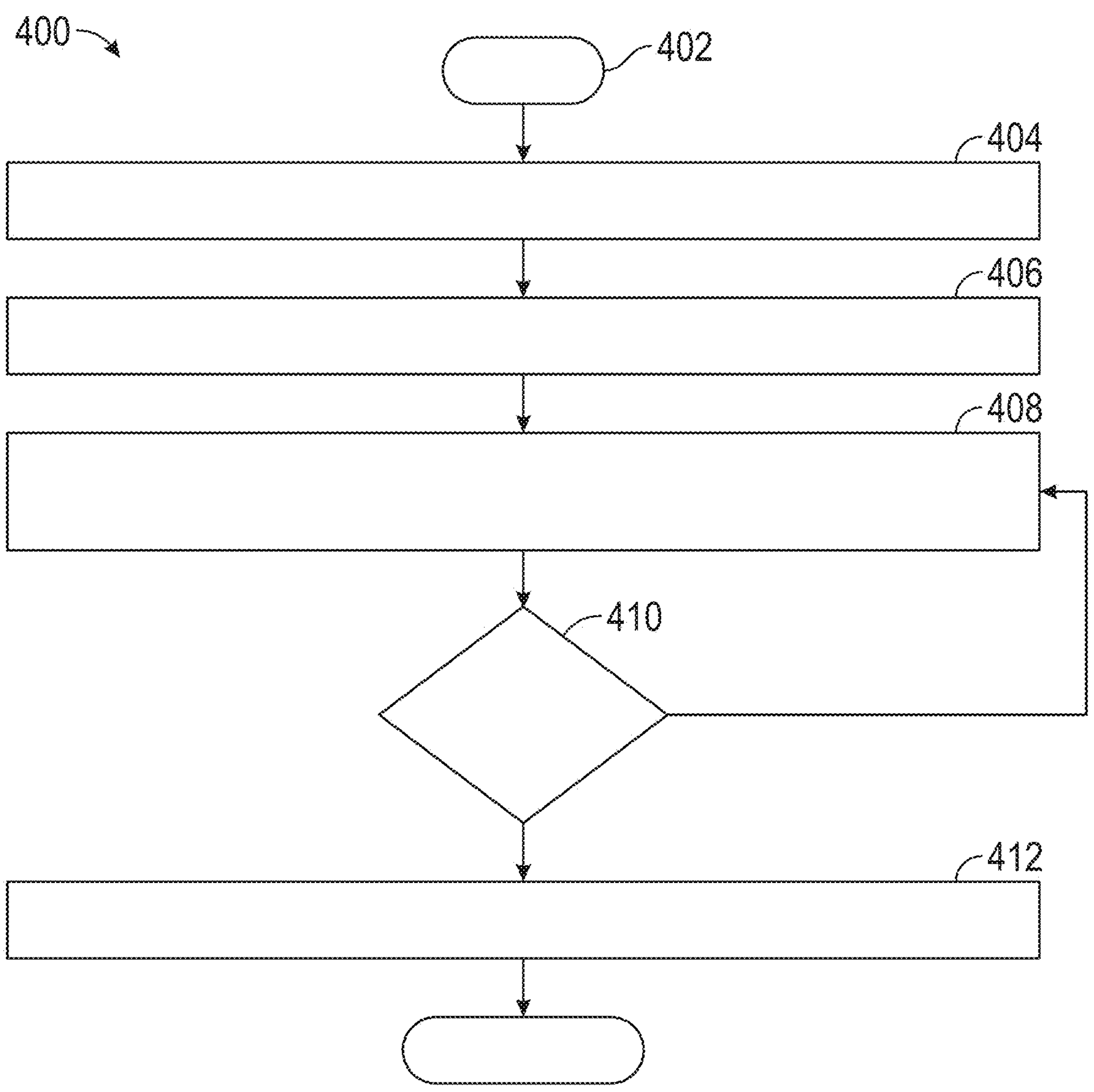
FIG. 6 is a flow chart of the routine for identifying adjacent lanes to a travel lane for the vehicle of FIG. 4 in further detail.

As shown in FIG. 6, the routine 400 for identifying adjacent lanes to the travel lane of method 50 is provided in further details. The vehicle 12 executes the routine 400 and starts at step 402. From step 402, the routine 400 proceeds to step 404. At step 404, the vehicle 12 selects a first point of the travel lane using the MAP data. The first point of the travel lane is the point closest to the traffic intersection. The routine 400 proceeds from step 404 to step 406. The vehicle 12 then iterates on any remaining lanes of the identified lanes in the MAP data and proceeds from step 406 to step 408. At step 408, the vehicle 12 computes a difference in coordinates between the first point of the travel lane and a first point of each of the remaining lanes and proceeds from step 408 to step 410. Using the difference in coordinates, the vehicle 12 determines whether each lane of the remaining lanes is an adjacent lane of the travel lane based on a longitudinal distance between each of the first point of the travel lane and the first point of each of the remaining lanes and a distance threshold at step 410. If the distance between the first point of the travel lane and the first point of a remaining lane is greater than a difference between the predetermined threshold and the longitudinal distance, the vehicle executes step 410 from step 408. Otherwise, the routine 400 returns to step 408. At step 414, the vehicle 12 sets a respective lane as an adjacent lane and proceeds to routine 500.

Figure 7:
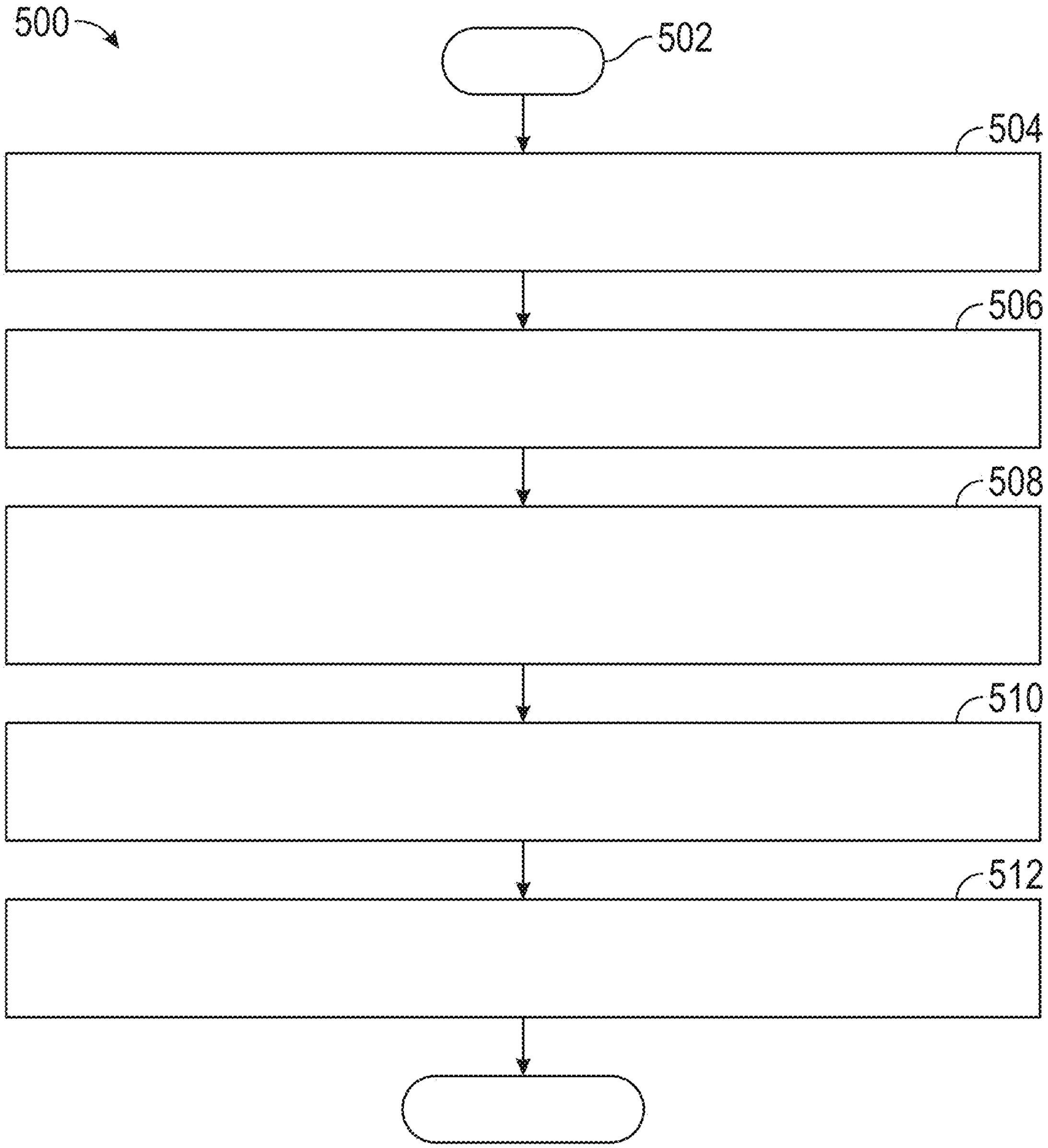
FIG. 7 is a flow chart of a routine for determining whether a lane adjacent to a travel lane for the vehicle is a right lane or a left providing further details on the method of FIG. 2.

Now turning to FIG. 7, the routine 500 for determining whether an adjacent lane to a travel lane for a vehicle 12 is a right lane or a left lane of the method 50 is provided in further details. The routine 500 starts at step 502 and proceeds to step 504. At step 504, the vehicle 12 selects first two points of the travel lane closest to the traffic intersection, such as a first point and a second point. After selecting the first two points, the routine 500 proceeds from step 504 to step 506. Using the two points, the vehicle 12 computes a first position vector between the first point and the second point of the travel lane closest to the intersection at step 506 then proceeds to step 508. At step 508, the vehicle 12 computes a second position vector between the second point of the travel lane closest to the intersection and the first point of each adjacent lane to the travel lane and proceeds to step 510. The vehicle 12 computes a sign of cross product of the first position vector and the second position vector and proceeds from step 510 to step 512. At step 512, the vehicle 12 identifies each adjacent lane as a right lane or a left lane of the travel lane of the vehicle 12 based on the sign of the cross product and proceeds to the routine 600.

Figure 8:
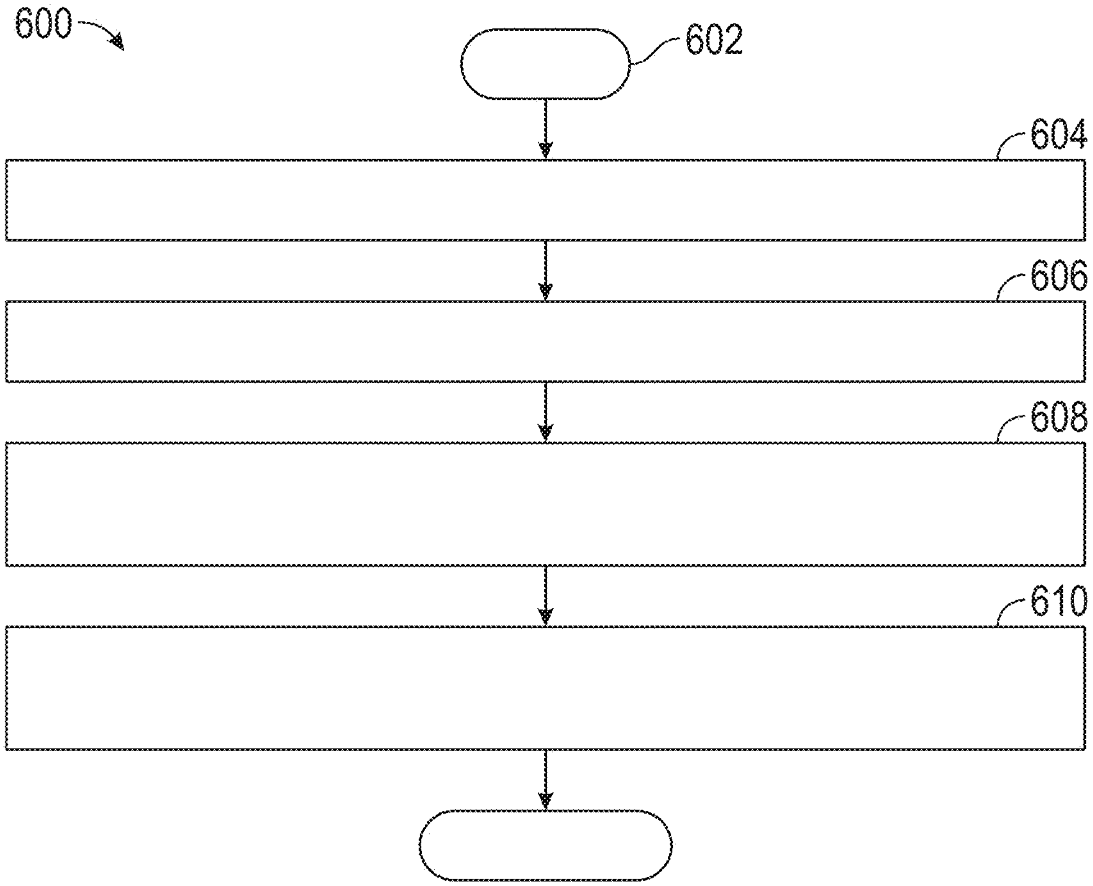
FIG. 8 is a flow chart of a routine for determining a route using a future travel lane for the vehicle further defining the method of FIG. 2.

In another embodiment, the routine 600 for determining a route using a future travel lane for the vehicle 12 of the method 50 is provided in further details in FIG. 8. In one form, the vehicle 12 implements the routine 600 starting at step 602 and proceeding to step 604. At step 604, the vehicle 12 finds adjacent lanes with the same allowed maneuvers as the travel lane associated with the vehicle 12 and proceeds to step 606. The vehicle 12 then determines whether another vehicle is located ahead of the vehicle 12 in the same lane as the travel lane, an adjacent lane to the travel lane, or a combination thereof. In one form, the vehicle 12 receives sensed data, from a plurality of vehicle sensors, indicating that another vehicle is located ahead of the vehicle 12 in the same lane as the travel lane, the adjacent lane to the travel lane or a combination thereof. In another form, the vehicle 12 determines whether another vehicle is ahead of the vehicle 12 in same lane as the travel lane, an adjacent lane to the travel lane based on a vehicle-to-vehicle message. In one form, the vehicle-to-vehicle message includes vehicle location data and vehicle speed data associated with a respective vehicle. In one form, the vehicle 12 detects whether another vehicle is located ahead of the vehicle 12 in the same lane as the travel lane, an adjacent lane to the travel lane, or a combination thereof based on the travel lane and one or more adjacent lanes for the vehicle 12 and at least one of the sensed data, the vehicle-to-vehicle message or a combination thereof. After determining whether another vehicle is ahead of the vehicle 12, the routine 600 proceeds from step 606 to step 608. At step 608, the vehicle 12 determines whether to traverse from the travel lane to an adjacent lane based on at least one of determining whether another vehicle is located ahead of the vehicle 12, a vehicle speed for a respective vehicle located ahead of the vehicle 12, a recommended speed, or a combination thereof. In one form, the vehicle 12 calculates the recommended vehicle speed that is a vehicle speed for the vehicle 12 to approach the traffic intersection to encounter a green light associated with the traffic light located at the traffic intersection based on the traffic signal information. In one form, the recommended vehicle speed for the vehicle 12 that identifies an optimal vehicle speed to approach the traffic intersection to catch a green light associated with the traffic light.

For example, the vehicle 12 may include a Green Light Optimal Speed Advisory (GLOSA) application that computes the recommended speed for approaching the traffic intersection 14. In another example, the routine 600 calculates the recommended vehicle speed based on the MAP data and the location of the vehicle. In another form, the traffic signal information further includes the recommended vehicle speed. In one form, the vehicle 12 determines to traverse from the travel lane to the adjacent lane when the vehicle speed for the vehicle 12 is less than the recommended speed for the vehicle 12 within a predetermined threshold. In another form, the vehicle 12 determines to remain in the travel lane when the vehicle speed for the vehicle 12 is greater than the recommended speed for the vehicle 12 within a predetermined threshold. The routine 600 proceeds from step 608 to step 610. The vehicle 12 compiles another route having the adjacent lane as a future travel lane for the vehicle 12 based on determining to traverse from the travel lane to the adjacent lane at step 610 and proceeding to routine 700.

Figure 9:
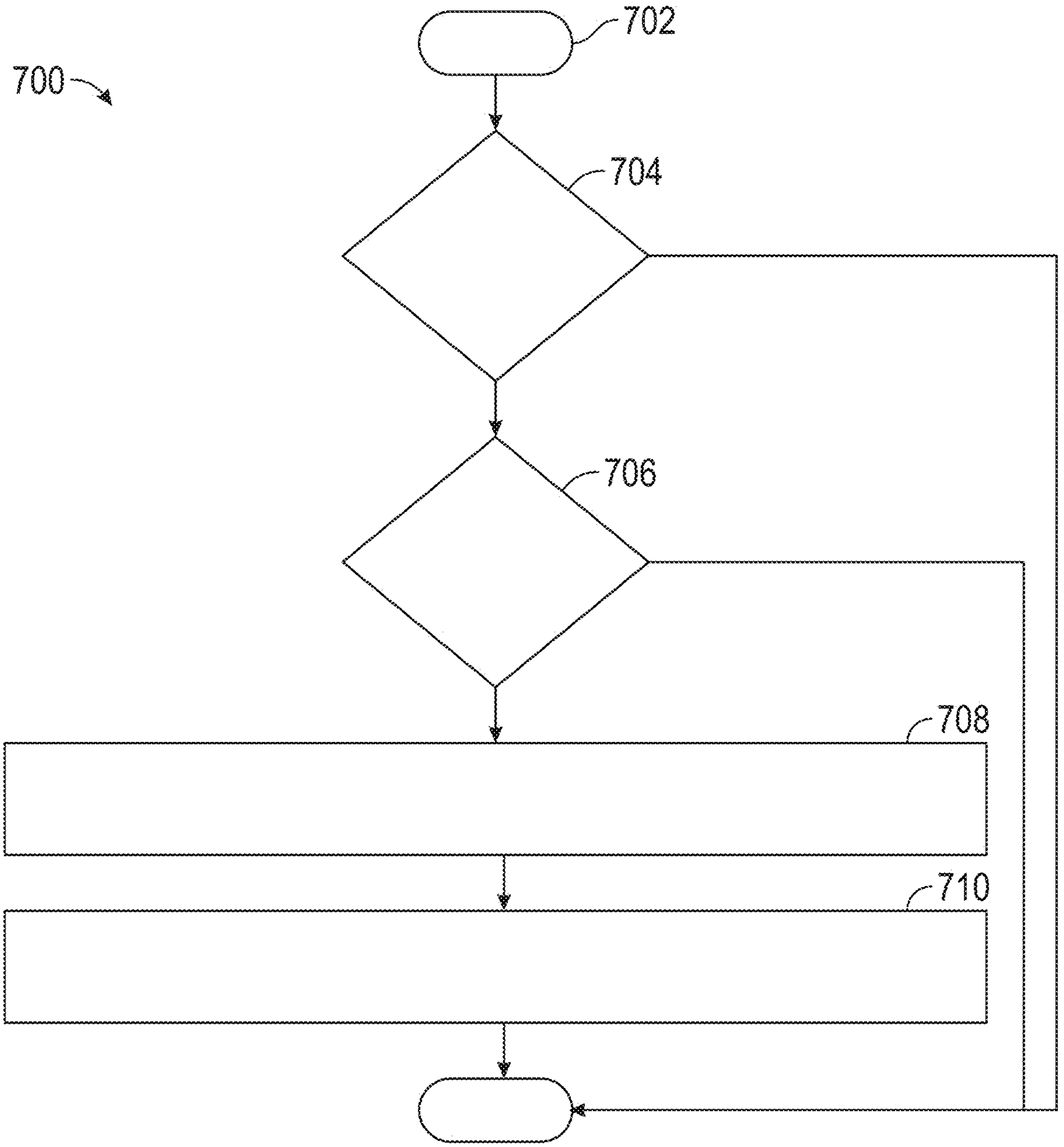
FIG. 9 is a flow chart of a routine for determining whether to employ an engine stop/start feature in a vehicle further defining the method of FIG. 2.

Now referring to FIG. 9, the routine 700 determines whether to employ an engine stop/start feature in the vehicle 12. The vehicle 12 employs the routine 700 and starts at step 702. The engine start/stop feature includes a control to automatically shut off a vehicle engine of the vehicle 12 when the vehicle 12 is stopped with its engine idling for a predetermined time and a vehicle brake is engaged, then starts the vehicle engine when the vehicle brake is disengaged. The routine 700 proceeds from step 702 to step 704. At step 704, the vehicle 12 determines whether the vehicle 12 is stopped and a vehicle engine is running. In one form, the vehicle 12 receives a brake signal, via a brake padel sensor (not shown) of the vehicle 12, indicating that that the vehicle 12 has stopped. If the vehicle 12 is stopped and the vehicle engine is running, the routine 700 proceeds from step 704 to step 706. Otherwise, the routine 700 proceeds from 704 to return. At step 706, the vehicle 12 determines whether the phase of traffic light is RED. In one form, the vehicle 12 determines that the phase of the traffic light is RED and proceeds from step 706 to step 708. Otherwise, the vehicle 12 proceeds from 706 to return. In addition to determining the phase of the traffic light, the vehicle 12 determines a total clearance time for a queue to clear ahead of the vehicle 12 and proceeds from step 708 to step 710. Based on the phase of the traffic light and the total clearance time, the vehicle 12 determines whether to activate the engine stop/start feature to stop the vehicle engine at step 710. In one example, the vehicle 12 outputs a control operation to activate the engine stop feature to stop the vehicle engine when the total clearance time is greater than a stop threshold time. In another example, the vehicle 12 outputs a control operation to disengage the engine stop/start feature to keep the vehicle engine running when the total clearance time is less than the stop threshold time. The routine 700 proceeds from step 710 to RETURN.

Figure 10:
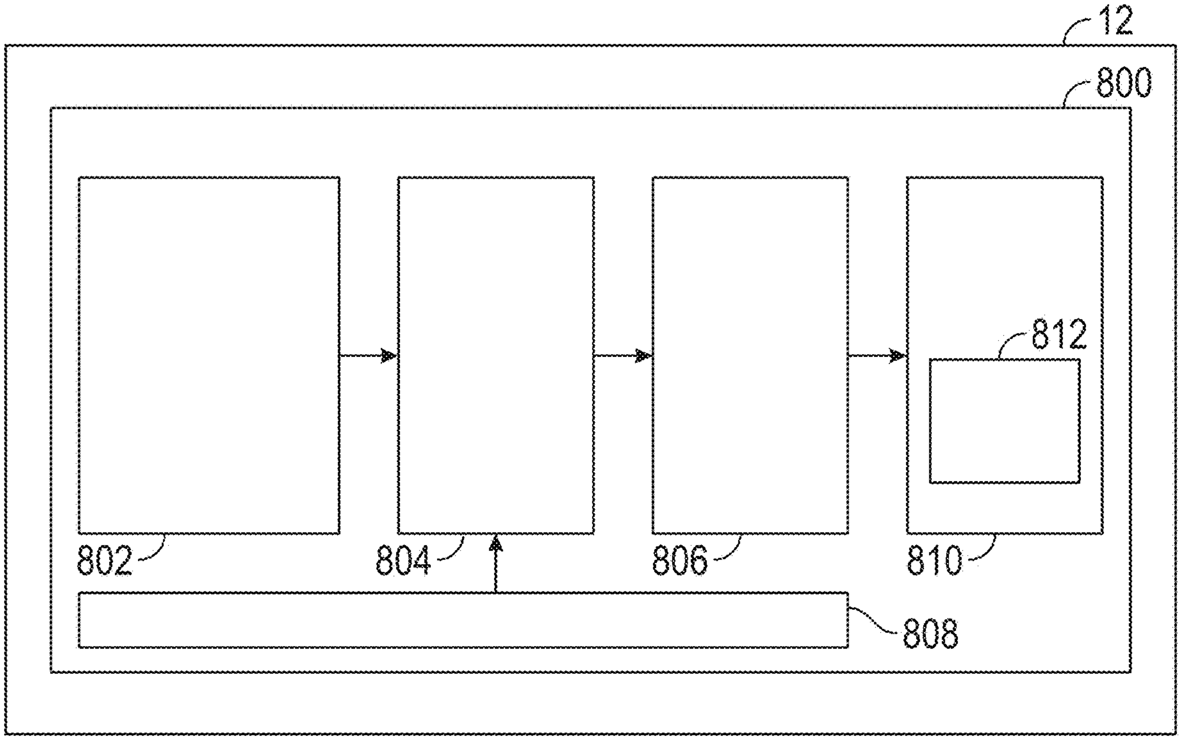
FIG. 10 is a block diagram of an example system implementing the method and routines of FIGS. 2-9.

Referring now to FIG. 10, an example vehicle 12 is provided having a system 800 to implement the method 50 as provided in FIGS. 2-9 above. For example, the following description of the system 800 is provided using the method 50 as provided above. In one form, the vehicle 12 is a transportation vehicle such as a passenger vehicle. In another form, the transportation vehicle may include a bus, a motorcycle, a commercial vehicle, and the like. The transportation vehicle may include a semi-autonomous vehicle or an autonomous vehicle. The transportation vehicle includes a vehicle system 800 having a communication module 802, a controller 804, an in-vehicle application module 806, and a plurality of vehicle sensors 808.

The communication module 802 is enabled to receive broadcast messages within a predetermined range surrounding the vehicle 12. The communication module 802 may transmit or receive broadcasts messages or other vehicle related data messages (e.g., data packets containing messages or data) using a dedicated communication protocol, such as a dedicated short-range communication (DSRC), a vehicle-to-vehicle (V2V) communication system, a Cellular Vehicle-to-Everything (C-V2X), Vehicle-to-Infrastructure (V2I), Vehicle-to-People (V2P), 5GLTE cellular communication, or the like. Using this communication broadcast protocol, the communication module 802 is able to receive at low latency to ensure that messages can be quickly transmitted and received. The communication module 802 also manages incoming and outgoing data transmission for its respective communication network and may employ asymmetric encryption to secure broadcast messages transmitted or exchanged with the GPS system, the traffic control device, other traffic system infrastructure devices and other vehicles. The communication module 802 employs steps 104 and 106 of the method 100, and receives the traffic signal information from the traffic light 20 located about the traffic intersection. Upon receiving the traffic signal information, the communication module 802 also receives global positioning data associated with the vehicle 12. The global positioning data includes vehicle location data for the vehicle 12.

Using the traffic signal information and the global positioning data, the controller 804 employs steps 108 and 110 of the routine 100, and determines a travel lane of the identified lanes for the vehicle based on the traffic signal information and the global positioning data to output as travel lane data for evaluation by the in-vehicle application 806 of the vehicle 12 to configure a future vehicle operation. In one form, the future vehicle operation includes determining one or more future travel routes, such as selecting an alternative travel lane for the vehicle. In another form, the future vehicle operation includes an engine operation, such as initiating an engine start/stop feature for the vehicle when about or near the traffic intersection. In some embodiments, the controller 804 transmits the travel lane data to the in-vehicle application 806 of the vehicle 12 to configure the future travel routes, the engine operation, or the combination thereof.

In another example, the controller 804 implements the routine 200 for determining one or more adjacent lanes along a travel lane for the vehicle when the vehicle 12 is approaching a traffic light at a traffic intersection. The controller 804 determines a travel lane of the vehicle 12 when approaching the traffic intersection. In one form, the controller 804 determines the travel lane of the vehicle 12 as the vehicle 12 is approaching the traffic light at the traffic intersection. After determining the travel lane, the controller 804 determines whether one or more adjacent lanes to the travel lane exists based on the traffic signal information. If one or more adjacent lanes exist, the controller 804 determines whether each adjacent lane is a right lane or a left lane to the travel when the adjacent lane exists and outputs a control operation to control the future vehicle operation of the vehicle 12 in response to determining the travel lane of the vehicle 12 and determining whether the adjacent lane of travel of the vehicle 12 is a right lane or a left lane. In one form, the future vehicle operation includes displaying a graphical interface, on a display device 812 of vehicle 12, which indicates whether the adjacent lane to the travel lane is a right lane or a left lane.

In one form, the in-vehicle application module 806 receives the control operation from the controller 804 and activates or deactivates a vehicle operation associated with the in-vehicle application. The in-vehicle application module 806 includes one or more applications such as a navigation application, a lane change application, an auto stop/start feature, and an engine stop/start feature. The navigation application determines one or more available routes for the vehicle 12 to travel from a first location (e.g., current location) to a second location (e.g., destination) of the vehicle 12 and is in communication with a global navigation satellite system (not shown) to receive GPS data associated with the vehicle 12. The lane change application determines whether the vehicle 12 changes from the travel lane to an adjacent lane. The auto stop/start feature automatically shuts off and restarts the vehicle engine of the vehicle. The engine stop/start feature automatically turns off the vehicle engine when the brake is engaged for a period of time, then restarts the vehicle engine when the brake is disengaged.

The vehicle sensors 808 may take various forms including a LiDar sensor, a camera sensor, and a radar sensor. The sensors 808 detect another or second vehicle about an approximate distance to the vehicle and output a sensed data indicative of a detected vehicle near or about the vehicle 12 in response thereof. In one aspect, the sensed signal includes image data of the detected vehicle near or about the vehicle. The controller 804 receives the sensed signal and, in response, determines whether the detected vehicle is ahead of the vehicle 12 in the same lane as the travel lane of the vehicle 12, an adjacent lane to the travel lane of the vehicle 12 or a combination thereof based on the sensed signal. The controller 804 receives the image data and determines whether another or a second vehicle is ahead of the vehicle based on the image data. In one form, the controller 804 utilizes image processing to detect whether a second vehicle is ahead of the vehicle 12.

In some embodiments, the vehicle 12 includes a user interface 810 having a display device 812. The display device 812 includes a graphical interface (not shown) that displays a number of lanes 18 associated with the road 16 travelled on by the vehicle 12 to a user of the vehicle 12. The graphical interface can include an image displayed on the display device 812. In another form, the display device 812 displays an indication identifying the travel lane traversed by the vehicle 12 and one or more adjacent lanes to the travel lane.

The present disclosure provides various example embodiments for the methods and systems contemplated by the Applicant, those familiar with the art to which this disclosure relates will recognize various alternative designs and embodiments for practicing the disclosure within the scope of the appended claims.

What is claimed is:

1. A method for identifying a route of travel for a vehicle operating an in-vehicle application as the vehicle is approaching a traffic light at a traffic intersection, the method comprising:

a) receiving, by a controller of the vehicle, a traffic signal information from a traffic control device located about the traffic intersection that junctions two or more roads together, wherein the traffic signal information includes map data related to geographical information pertaining to features of the traffic intersection and identified lanes for each road at the traffic intersection, and wherein the traffic signal information includes signal, phase and timing data for the traffic light;

b) receiving, by the controller of the vehicle, a global positioning data having a vehicle location data for the vehicle;

c) determining a travel lane of the identified lanes for the vehicle based on the traffic signal information and the global positioning data to output as travel lane data for evaluation by the in-vehicle application to configure a future vehicle operation for the vehicle, wherein the step c) further comprises:

iterating a list of all ingress lanes based on the map data of the traffic signal information;

iterating on one or more waypoints for each lane of the list of all ingress lanes;

converting a location of each waypoint to x,y coordinates with respect to the location of the vehicle;

determining a distance between each waypoint of the one or more waypoints and the location of the vehicle; and identifying the travel lane based on a selected waypoint that is closest in distance to the vehicle based on the distance between each waypoint and the location of the vehicle;

determining whether an adjacent lane to the travel lane exists based on the traffic signal information;

determining whether the adjacent lane is a right lane or a left lane relative to the travel when the adjacent lane exists; and outputting a control operation to control the future vehicle operation in response to determining the travel lane of the vehicle and determining whether the adjacent lane is the right lane or the left lane.

2. The method of claim 1, wherein the future vehicle operation includes determining a future travel route, an engine operation, or a combination thereof for the vehicle.

3. The method of claim 2 further comprising transmitting the travel lane data to the in-vehicle application of the vehicle to configure the future travel route, the engine operation, or the combination thereof.

4. The method of claim 1, wherein the control operation is selected from the group consisting of:

i) selecting an alternative travel lane for the vehicle;

ii) initiating an engine start/stop feature for the vehicle when about or near the traffic intersection;

iii) displaying an indicator that indicates whether the adjacent lane to the travel lane is the right lane or the left lane; or iv) a combination thereof.

5. The method of claim 1, wherein the step of identifying the travel lane based on the waypoint that is closest to the vehicle further comprises:

d) selecting a first point of the travel lane near or about the traffic intersection;

e) iterating the step d for any remaining lanes of the identified lanes based on the map data;

f) computing a difference in coordinates between the first point of the travel lane and a first point of each of the remaining lanes;

g) determining whether each lane of the remaining lanes is the adjacent lane of the travel lane based on a longitudinal distance between each of the first point of the travel lane and the first point of each of the remaining lanes; and h) identifying whether each lane determined as the adjacent lane to the travel lane is the right lane or the left lane.

6. The method of claim 5, wherein the step of identifying whether each lane determined as the adjacent lane further comprises:

selecting a first point and a second point of the travel lane closest to the traffic intersection;

computing a first position vector between the first point and the second point of the travel lane closest to the traffic intersection;

computing a second position vector between the second point of the travel lane closest to the traffic intersection and the first point of each adjacent lane to the travel lane;

computing a sign of a cross product of the first position vector and the second position vector; and identifying each adjacent lane as the right lane or the left lane of the travel lane of the vehicle based on the sign of the cross product.

7. The method of claim 1, further comprising:

detecting whether another vehicle is located ahead of the vehicle in the same lane as the travel lane, each adjacent lane to the travel lane, or a combination thereof;

determining whether to traverse from the travel lane to the adjacent lane based on at least one of determining whether another vehicle is located ahead of the vehicle, a vehicle speed for a respective vehicle located ahead of the vehicle, a recommended vehicle speed or a combination thereof, wherein the traffic signal information further includes the recommended vehicle speed being a vehicle speed for the vehicle to approach the traffic intersection to encounter a green light associated with the traffic light located at the traffic intersection; and compiling another route having the adjacent lane as a future travel lane for the vehicle based on determining whether to traverse from the travel lane to the adjacent lane.

8. The method of claim 1, wherein:

the traffic signal information includes allowed lane maneuvers for each of the identified lanes; and the step of outputting the control operation comprises:

computing a recommended vehicle speed that is a desired vehicle speed for the vehicle to approach the traffic intersection to encounter a green light associated with the traffic light located at the traffic intersection based on the traffic signal information;

displaying, via a display device of the vehicle, the recommended vehicle speed; and displaying the allowed lane maneuvers for the travel lane and the adjacent lane of travel.

9. A system for identifying a route of travel for a vehicle operating an in-vehicle application as the vehicle is approaching a traffic light at a traffic intersection, the system comprising:

a processor; and a non-transitory storage medium having program instructions executed by the processor, wherein the program instructions are configured to:

receive a traffic signal information from a traffic control device located about the traffic intersection having two or more roads joining together, wherein the traffic signal information includes map data related to geographical information pertaining to features of the traffic intersection and identified lanes for each road at the traffic intersection, and wherein the traffic signal information includes signal, phase and timing data for the traffic light;

receive a global positioning data having a vehicle location data for the vehicle;

determine a travel lane of the identified lanes for the vehicle based on the traffic signal information and the global positioning data to output as travel lane data for evaluation by the in-vehicle application of the vehicle to configure a future vehicle operation for the vehicle;

compile the route having the travel lane for the vehicle based on the program instructions being configured to determine the travel lane;

output a control operation to control the future vehicle operation in response to the route being compiled;

determine whether an adjacent lane to the travel lane exists based on the traffic signal information;

determine whether the adjacent lane is a right lane or a left lane to the travel lane when the adjacent lane exists;

detect whether another vehicle is located ahead of the vehicle in the same lane as the travel lane, the adjacent lane to the travel lane, or a combination thereof;

determine whether to traverse from the travel lane to the adjacent lane based on the adjacent lane exists, and at least one of another vehicle being located ahead of the vehicle, a vehicle speed for another vehicle located ahead of the vehicle, a recommended vehicle speed for the vehicle or a combination thereof, wherein the traffic signal information further includes the recommended vehicle speed being a vehicle speed for the vehicle to approach the traffic intersection to catch a green light associated with the traffic light located at the traffic intersection;

compile a second route having the adjacent lane as a future travel lane for the vehicle based on the program instructions being configured to determine whether to traverse from the travel lane to the adjacent lane; and output the control operation to control the future vehicle operation in response to the second route being compiled.

10. The system of claim 9, wherein the future vehicle operation includes determining a future travel route, an engine operation, or a combination thereof for the vehicle.

11. The system of claim 10, wherein the program instructions are further configured to transmit the travel lane data to the in-vehicle application to configure a future travel route, the engine operation, or the combination thereof.

12. The system of claim 9, wherein the driving is selected from the group consisting of:

i) selecting an alternative travel lane for the vehicle;

ii) initiating an engine start/stop feature for the vehicle when about or near the traffic intersection;

iii) displaying an indicator that indicates whether the adjacent lane to the travel lane is the right lane or the left lane; or iv) a combination thereof.

13. The system of claim 9, wherein the program instruction of determining the travel lane of the identified lanes for the vehicle is further configured to:

iterate a list of all ingress lanes based on the map data of the traffic signal information;

iterate on one or more waypoints for each lane of the list of all ingress lanes;

convert a location of each waypoint to x,y coordinates with respect to the location of the vehicle;

determine a distance between each waypoint of the one or more waypoints and a location the vehicle; and identify the travel lane based on a selected waypoint that is closest in distance to the location of the vehicle based on the distance between each waypoint and the location of the vehicle.

14. The system of claim 13, wherein the program instruction of identifying the travel lane based on the waypoint that is closest to the vehicle is further configured to:

a) select a first point of the travel lane near or about the traffic intersection;

b) iterate the step a) for any remaining lanes of the identified lanes based on the map data;

c) compute a difference in coordinates between the first point of the travel lane and a first point of each of the remaining lanes;

d) determine whether each lane of the remaining lanes is an adjacent lane to the travel lane based on a longitudinal distance between each of the first point of the travel lane and the first point of each of the remaining lanes; and e) identify whether each lane determined as the adjacent lane to the travel lane is the right lane or the left lane.

15. The system of claim 14, wherein the program instruction of identifying whether each lane determined as the adjacent lane is further configured to:

select a first point and a second point of the travel lane closest to the traffic intersection;

compute a first position vector between the first point and the second point of the travel lane closest to the traffic intersection;

compute a second position vector between the second point of the travel lane closest to the traffic intersection and a first point of each adjacent lane to the travel lane;

compute a sign of a cross product of the first position vector and the second position vector; and identify each adjacent lane as the right lane or the left lane of the travel lane of the vehicle based on the sign of the cross product.

16. A vehicle comprising:

a processor; and a non-transitory storage medium having program instructions executed by the processor, wherein the program instructions are configured to:

receive a traffic signal information from a traffic control device located about a traffic intersection having two or more roads joining together as the vehicle is approaching a traffic light at the traffic intersection, wherein the traffic light is located at the traffic intersection, and wherein the traffic signal information includes map data related to geographical information pertaining to features of the traffic intersection and identified lanes for each road junction at the traffic intersection, and wherein the traffic signal information includes signal, phase and timing data for the traffic light and allowed lane maneuvers for each of the identified lanes;

receive a global positioning data having a vehicle location data for the vehicle;

determine a travel lane of the identified lanes for the vehicle based on the traffic signal information and the global positioning data to output as travel lane data for evaluation by an in-vehicle application of the vehicle to configure a future vehicle operation for the vehicle;

determine whether an adjacent lane to the travel lane exists based on the traffic signal information;

determine whether the adjacent lane is a right lane or a left lane to the travel when the adjacent lane exists; and output a control operation to control the future vehicle operation in response to the program instructions being configured to determine the travel lane of the vehicle and determine whether the adjacent lane of travel of the vehicle is the right lane or the left lane, wherein the program instructions being configured to output the control operation comprises:

compute a recommended vehicle speed that is a desired vehicle speed for the vehicle to approach the traffic intersection to encounter a green light associated with the traffic light located at the traffic intersection based on the traffic signal information;

display, via a display device of the vehicle, the recommended vehicle speed; and display the allowed lane maneuvers for the travel lane and the adjacent lane of travel.

17. The vehicle of claim 16, wherein the program instruction configured to determine the travel lane of the identified lanes for the vehicle is further configured to:

iterate a list of all ingress lanes based on the map data of the traffic signal information;

iterate on one or more waypoints for each lane of the list of all ingress lanes;

convert a location of each waypoint to x,y coordinates with respect to the location of the vehicle;

determine a distance between each waypoint of the one or more waypoints and a location the vehicle; and identify the travel lane based on a selected waypoint that is closest in distance to the vehicle based on the distance between each waypoint and the vehicle.

18. The vehicle of claim 16, wherein the program instruction configured to identify the travel lane based on the waypoint that is closest to the vehicle is further configured to:

a) select a first point of the travel lane near or about the traffic intersection;

b) iterate the step a) for any remaining lanes of the identified lanes based on the map data;

c) compute a difference in coordinates between the first point of the travel lane and a first point of each of the remaining lanes;

d) determine whether each lane of the remaining lanes is the adjacent lane of the travel lane based on a longitudinal distance between each of the first point of the travel lane and the first point of each of the remaining lanes; and e) identify whether each lane determined as the adjacent lane to the travel lane is the right lane or the left lane.

19. The vehicle of claim 16, wherein the program instruction configured to identify whether each lane determined as the adjacent lane is further configured to:

select a first point and a second point of the travel lane closest to the traffic intersection;

compute a first position vector between the first point and the second point of the travel lane closest to the traffic intersection;

compute a second position vector between the second point of the travel lane closest to the traffic intersection and a first point of each adjacent lane to the travel lane;

compute a sign of a cross product of the first position vector and the second position vector; and identify each adjacent lane as the right lane or the left lane of the travel lane of the vehicle based on the sign of the cross product.

20. The vehicle of claim 16, wherein the program instructions are further configured to:

detect whether another vehicle is located ahead of the vehicle in the same lane as the travel lane, each adjacent lane to the travel lane, or a combination thereof;

determine whether to traverse from the travel lane to the adjacent lane based on at least one of determining whether another vehicle is located ahead of the vehicle, a vehicle speed for a respective vehicle located ahead of the vehicle, the recommended vehicle speed or a combination thereof, wherein the traffic signal information further includes the recommended vehicle speed being a vehicle speed for the vehicle to approach the traffic intersection to catch the green light associated with the traffic light located at the traffic intersection;

compile another route having the adjacent lane as a future travel lane for the vehicle based on determining whether to traverse from the travel lane to the adjacent lane; and output the control operation to control the future vehicle operation in response to the program instructions being configured to compile another route.

* * * * *